(12) United States Patent
Francese et al.

(10) Patent No.: US 9,258,109 B2
(45) Date of Patent: Feb. 9, 2016

(54) CLOCK RECOVERY METHOD AND APPARATUS

(71) Applicant: International Business Machines Corporation, Armonk, NY (US)

(72) Inventors: Pier A. Francese, Adliswil (CH); Lukas Kull, Zurich (CH); Thomas H. Toifl, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/561,554

(22) Filed: Dec. 5, 2014

(65) Prior Publication Data

US 2015/0180648 A1 Jun. 25, 2015

(30) Foreign Application Priority Data

Dec. 20, 2013 (GB) .................................. 1322649.3

(51) Int. Cl.
*H04L 7/00* (2006.01)
*H04L 7/02* (2006.01)

(52) U.S. Cl.
CPC ........................................ *H04L 7/02* (2013.01)

(58) Field of Classification Search
CPC ....... H04L 7/033; H04L 7/0337; H04L 7/087; H04L 7/0891
USPC .......... 375/371, 373, 374, 376; 455/103, 127; 327/156
See application file for complete search history.

(56) References Cited

U.S. PATENT DOCUMENTS

| 5,706,314 | A | * | 1/1998 | Davis et al. ................... 375/340 |
| 6,873,668 | B2 | | 3/2005 | Yamamoto et al. |
| 8,194,792 | B2 | | 6/2012 | Aziz et al. |
| 2004/0184551 | A1 | * | 9/2004 | Liu et al. ....................... 375/260 |
| 2009/0060091 | A1 | | 3/2009 | Hagleitner et al. |
| 2009/0147895 | A1 | * | 6/2009 | McKown ....................... 375/354 |
| 2012/0328063 | A1 | | 12/2012 | Vasani et al. |
| 2013/0251084 | A1 | | 9/2013 | Werner |

FOREIGN PATENT DOCUMENTS

WO          0152469 A1     7/2001

OTHER PUBLICATIONS

Francese et al., "Clock recovery method and apparatus", United Kingdom patent application 1322649.3, Filed Dec. 20, 2013.
Francese et al., "Clock recovery method and apparatus", United Kingdom patent application 1420722.9, Filed Nov. 21, 2014.

* cited by examiner

*Primary Examiner* — Khai Tran
(74) *Attorney, Agent, or Firm* — Daniel R. Simek

(57) ABSTRACT

The invention relates to a phase rotation method for a clock recovery, comprising the steps of: providing a timing estimation value that indicates for each input data symbol at least whether an input data sample has been sampled early or late by a sampling clock signal; generating a phase offset value indicating a phase rotation of the sampling clock signal based on the timing estimation value; modifying the timing function value based on a change of the phase offset value, resulting in the timing estimation value.

18 Claims, 4 Drawing Sheets

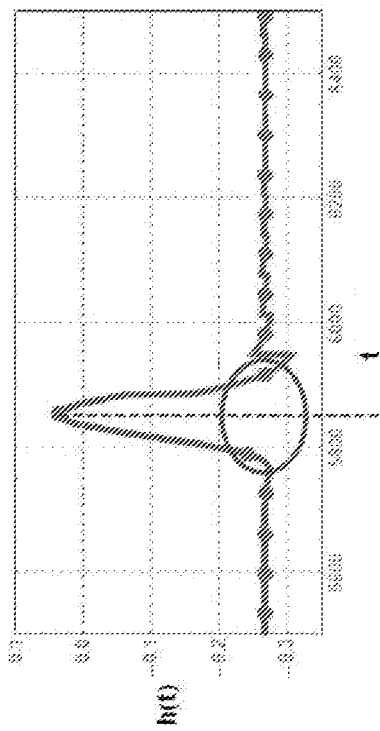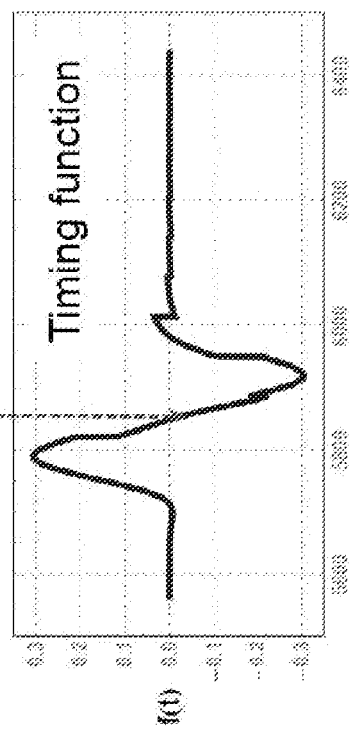
Fig. 3a
Fig. 3b

CLOCK RECOVERY METHOD AND APPARATUS

CROSS-REFERENCE TO RELATED APPLICATION

This application claims the benefit of priority under 35 U.S.C. 119 from Application No. 1322649.3, filed on Dec. 20, 2013 in The United Kingdom.

BACKGROUND OF THE INVENTION

The present invention relates generally to the field of clock and data recovery methods and apparatuses in general, and more particularly to measures to handle a latency of a clock recovery loop.

Clock and data recovery are an important technique to be used on the receiving side of electronic units. It is generally applied to a received high-speed serial data stream, which is transmitted without any reference to a clock signal.

High-speed digital inputs/outputs (IOs) for receiving an incoming data stream are usually based on an analog-to-digital converter sampled by a phase-rotated clock signal. The phase-rotated clock signal is obtained by means of a clock and data recovery mechanism. Analog-to-digital converters, as well as commonly applied subsequent feed-back equalizers, introduce a significant portion of a loop latency for a data item propagating through a clock recovery loop of the clock and data recovery mechanism. This loop latency generally affects the jitter tolerance specifications which are, e.g., for PCI express generation 3 and 4 and are difficult to meet. Thus, there is a general need to minimize a loop latency of the clock recovery loop.

Document US 2012/0328063 A1 describes a method and an apparatus for minimizing a loop latency caused by a demultiplexer and a phase error processor in a clock and data recovery system. By at least partially embedding a phase error processor into the demultiplexer, a portion of the total latency of a clock and data recovery architecture caused by the demultiplexer and the phase error processor can be reduced to less than a sum of the individual operation latencies.

Document U.S. Pat. No. 8,194,792 B2 discloses a clock and data recovery circuit in which a look-ahead technique is employed to produce a low-latency timing adjustment.

Document U.S. Pat. No. 6,873,668 B2 discloses a clock recovery circuit having two phase comparators operating in parallel and feeding a single loop filter. A first recovery section for recovering a clock signal from the known digital feedback control and a second clock recovery section including either analog feed-forward components or feedback components causing a much shorter clock delay are provided. A first feedback loop is configured to detect a first phase difference using the output of the digital filter and a second feedback loop is configured to detect a second phase difference using the output of the analog-digital converter. The gain of the second feedback loop is adaptively controlled. The second phase difference derived from the output of the analog-digital converter can be used to reduce the clock delay caused by the analog-digital converter thus contributing to boosting the gain of the clock recovery loop.

Document US 2013/0251084 A1 discloses a low-jitter clock recovery unit having a first phase detector for measuring the phase difference between a first clock signal from a voltage-controlled oscillator and a data signal. A phase shifter responsive to a control signal based on the phase difference adjusts the phase of an incoming clock signal to yield a second clock signal. The phase difference between the first clock signal and the second clock signal is measured and the resulting signal is low-pass filtered to derive a control signal for controlling the voltage-controlled oscillator. The phase-locked loop including the voltage-controlled oscillator filters out jitter.

SUMMARY

According to an embodiment of a first aspect, a phase rotation method for a clock recovery is provided, comprising the steps of: providing a timing estimation value at least indicating for each of the input data symbols whether an input data sample has been sampled early or late by a sampling clock signal; generating a phase offset value indicating a phase rotation of the sampling clock signal based on the timing estimation value; and modifying a timing function value which corresponds to an estimated timing difference relative to the sampling clock signal, based on a change of the phase offset value, resulting in the timing estimation value.

One idea of the phase rotation method according to embodiments of the invention is to introduce a virtual phase shift by introducing an offset to a timing function value in an inner loop. By introducing a virtual phase shift by arithmetically manipulating the digital samples it is possible to increase the tolerance for latency in the data sampling unit. Hence, high-bandwidth clock and data recovery resistance can be provided having a high-latency analog-digital converter. This may allow for supplying low-power analog-digital converters having a higher latency, so that low-power digital high-speed data receiving units can be provided.

According to an embodiment, the timing function may correspond to a Mueller-Müller timing function.

It may be provided that the timing function is calculated by a sum of terms, where each term multiplies a received input data sample with a decision-related data value.

According to an embodiment, the timing function value may be determined based on decision-related data values obtained by decision feedback equalizing.

Moreover, the phase offset value may be generated based solely on the sign of the timing estimation value. Alternatively, the phase offset value may be generated based on the sign and the amount of the timing estimation value.

It may be provided that decision-related data values are obtained based on a change of the phase offset value.

According to an embodiment, the phase offset value may be generated by applying a gain and an integration on the early/late signal to decide whether to increase or to decrease the phase offset value.

Furthermore, the timing function value may be modified based on an amplitude correction value which is based on a gradient of an impulse response characteristic of the data channel close to a zero crossing.

Moreover, the amplitude correction value may be further generated depending on a change of the phase offset value for a given number of symbols/cycles.

The given number of cycles may be selected based on the latency required for generating the phase offset value based on the timing estimation value.

It may be provided that a step of modifying the timing function value may be performed such that a change of the phase offset value shifting the sampling clock signal to "late," is responded to by a corresponding value for the amplitude correction offset A, which effects a change of the phase offset value shifting the sampling clock signal to "early," and/or such that a change of the phase offset value shifting the sampling clock signal to "early" is responded to by a corresponding value for the amplitude correction offset A which effects a change in the phase offset value shifting the sampling clock signal to "late."

According to an embodiment of a further aspect, a clock recovery method for recovering a clock from an incoming data stream is provided, wherein data samples are obtained from the incoming data stream by sampling based on a sampling clock signal, wherein the sampling clock signal has a phase rotation based on a phase offset value, wherein the phase offset value is obtained by the above phase rotation method.

According to an embodiment of a further aspect, a clock recovery apparatus is provided, comprising: an analog digital converter means for sampling an incoming data stream to obtain input data samples, a timing estimation means, which is configured to provide a timing estimation value at least indicating for each of the input data symbols whether an input data sample has been sampled early or late by a sampling clock signal; modify a timing function value, which corresponds to an estimated timing difference relative to the sampling clock signal, based on a change of the phase offset value resulting in the timing estimation value; and a phase rotation means for generating a phase offset value indicating a phase rotation of the sampling clock signal based on the timing estimation value.

In general, where features are described herein with reference to an embodiment of one aspect of the invention, corresponding features may be provided in embodiments of another aspect of the invention as appropriate.

BRIEF DESCRIPTION OF THE DRAWINGS

Embodiments will be described in more detail in conjunction with the accompanying drawings in which:

FIG. 3a shows an exemplary impulse response characteristics of the channel, in accordance with embodiments of the present invention.

FIG. 3b shows a derivation of the impulse response characteristics of FIG. 3a, in accordance with embodiments of the present invention.

DETAILED DESCRIPTION

Figure 1:
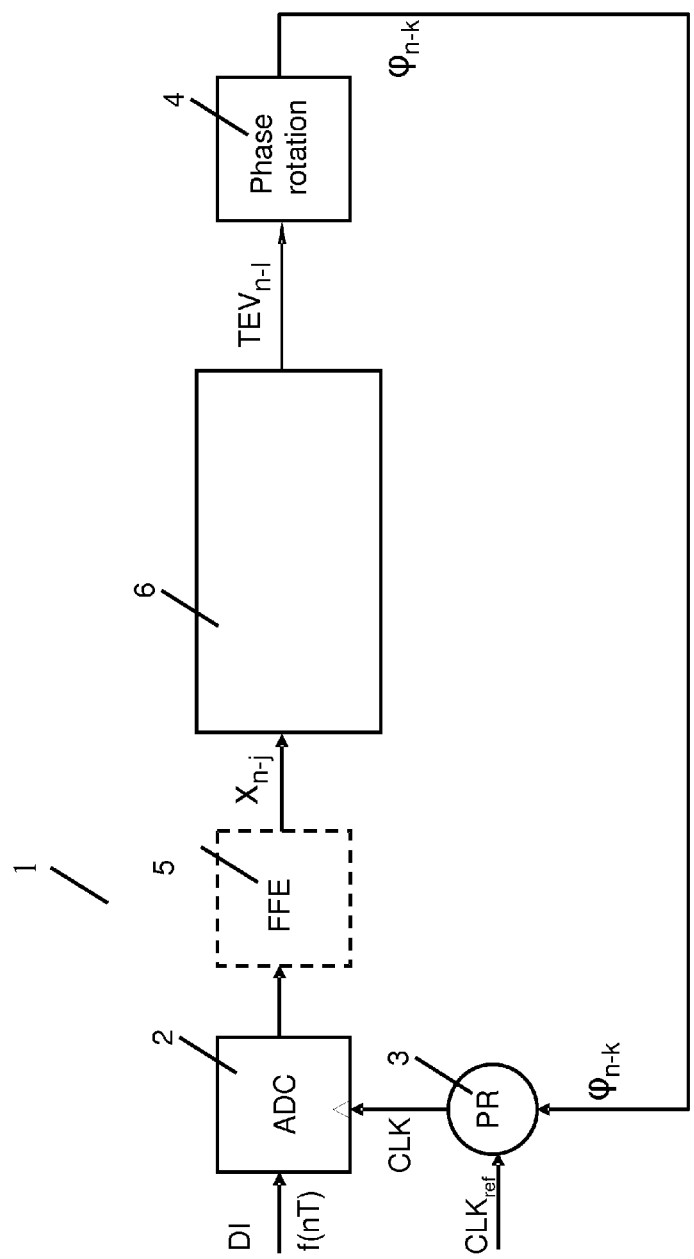
FIG. 1 shows a block diagram of a general data receiving unit for high-speed data streams, in accordance with embodiments of the present invention.

FIG. 1 schematically shows a data receiving unit 1 applied for receiving high-speed data streams, e.g. as received via multi-Gbps serial links such as IEEE 802.3AE, XAUI, Peripheral Component Interconnect (PCI) Express, Fibre Channel, and Rapid I/O.

In detail, an incoming data stream DI containing continuous data samples is received by an analog-digital converter (ADC) 2, which latches and samples the incoming data stream DI with respect to a sampling clock signal CLK. The phase position of the sampling clock signal CLK is determined by a phase rotation (PR) unit 3, which receives at least one reference clock signal $CLK_{ref}$ and applies a phase shift to the reference clock signal $CLK_{ref}$, wherein the phase shift is indicated by a phase offset value $\phi$. The phase offset value $\phi$ indicates a phase rotation offset for the supplied reference clock signal $CLK_{ref}$. In other words, the phase rotation unit 3 is adapted to offset the phase of the reference clock signal $CLK_{ref}$ depending on the provided phase offset value $\phi$.

Substantially, the reference clock signal $CLK_{ref}$ is supplied with a frequency which corresponds to the frequency of the data samples of the incoming data stream DI. Frequencies which are multiples of the frequency of the data samples can also be used for the reference clock signal $CLK_{ref}$.

The phase offset value $\phi$ is substantially determined by a phase rotation means 4, which determines the phase rotation offset $\phi$ based on a provided timing estimation value TEV. The phase rotation offset $\phi$ is generated to adapt the phase rotation of the sampling clock signal CLK applied to the analog-digital converter 2 to be synchronized with the received incoming data stream DI. The timing estimation value TEV indicates whether the respective input data sample has been sampled early or late with respect to the center of the data eye of an eye pattern of the incoming data stream DI. The phase rotation means 4 generally applies a second order control loop, i.e. applying a gain and an integration, on the timing estimation value TEV to decide whether to increase or to decrease the phase offset value $\phi$.

The sampled input data may be further supplied to a feed-forward equalizer (FFE) 5. The feed-forward equalizer 5 is optional, as indicated by the dashed box in FIG. 1. The feed-forward equalizer 5 may be configured to receive digitalized values of input data samples and applies an equalization technique, which corrects the received data pattern with information about the wave form independently of information about the logical decisions (interpretation) made on the wave form. Feed-forward equalization generally acts like an finite impulse response (FIR) filter and uses the voltage levels of the received wave form associated with previous and current bits to correct the voltage level of the current data bit. The feed-forward equalization is configured to obtain a corrected (or equalized) data sample value x (such as a voltage level) at a specific time by determining a sum of values (voltage levels) of a given number of previous data samples and a value (voltage level) of the current data sample. This is performed continuously to obtain a stream of digital corrected data samples x.

The analog-digital converter 2 and the (optional) feed-forward equalizer 5 apply a propagation delay of j data samples. At the input side of the analog-digital converter 2 an input data symbol f(t) is received, wherein t=nT, with T being the cycle time corresponding to the baud rate of the incoming data stream DI, i.e., the time between the received symbols, and n being any number of the received data symbols within the data stream DI based on a consecutive numbering of the received symbols. At the time the data symbol f(nT) is being received at the input of the analog-digital converter 2, the corrected/equalized data sample $x_{n-j}$ is output by the feed-forward equalizer 5.

A timing estimation means 6 is configured to receive the corrected data samples $x_{n-j}$ and to generate a timing estimation value $TEV_{n-l}$ with respect to each received data sample $x_{n-j}$, wherein l is the propagation delay between the input of the analog-digital converter 2 and the output of the early/late detection means 6. The timing estimation value $TEV_{n-l}$ is therefore delayed by the latencies of the analog-digital converter 2, the feed-forward equalizer 5, and the timing estimation means 6 (e.g., an early/late detection means), so that the generation of the phase offset value $\phi_{n-k}$ (k=propagation delay in number of symbols (or unit intervals (UI)) between the input of the analog-digital converter 2 and the output of the phase rotation means 4) in the phase rotation means 4 leads to a delayed phase offset correction in the phase rotation unit 3. However, any delay in the thus formed loop may result in an unstable phase rotation, so that jitter peeking might occur, which leads to a loss in jitter tolerance.

Figure 2:
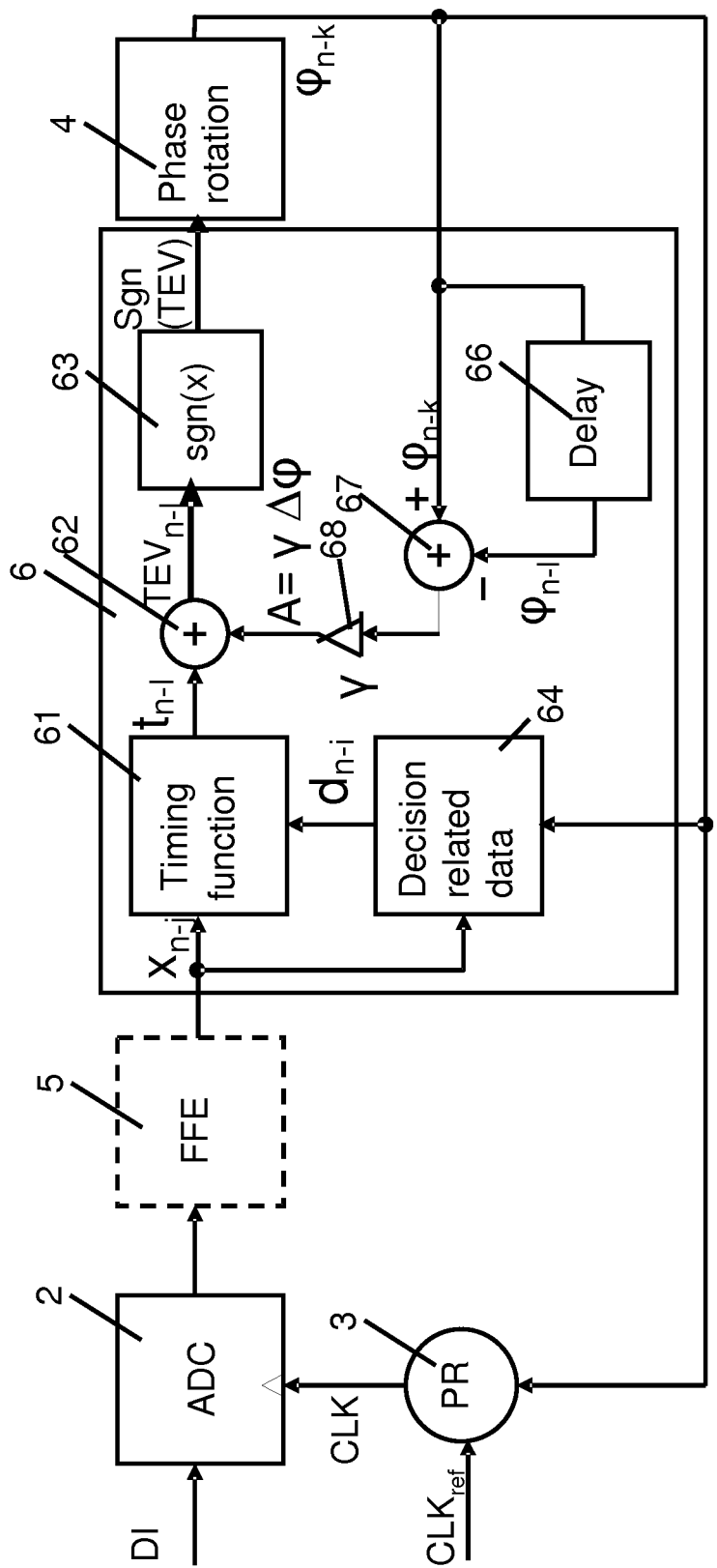
FIG. 2 shows a block diagram of a data recovery unit, in accordance with embodiments of the present invention.

In FIG. 2, the timing estimation means 6 is illustrated in more detail. The timing estimation means 6 has a timing function means 61 which receives the corrected data samples $x_{n-j}$ and applies a Mueller-Müller timing function. The Mueller-Müller timing function provides a digital timing function value $t_{n-j}$ by combining (e.g., adding up) one and more terms in which the sampled data $x_{n-j}$ is multiplied with symbol decisions dl as for example defined by:

$$t_{n-j} = x_{n-j} d_{n-j-1} - x_{n-j-1} d_{n-j}$$

wherein $x_{n-j-1}$ corresponds to the corrected data sample previous to the current corrected data sample $x_{n-j}$. Due to the delay of the timing function means 61, the digital timing function value $t_{n-j}$ equals the digital timing function value $t_{n-l}$ for the symbol n−1. The output of the timing function means 61 substantially indicates when a change of the value of subsequent data sampled occurred. In general, the timing function value $t_{n-l}$ corresponds to an estimated timing difference with respect to the sampling clock signal CLK. In other words the higher the amount of the timing function value, the earlier or later the timing of the sampling clock signal with respect to an optimal sampling clock signal.

The values $d_{n-j-1}$ and $d_{n-j}$ may correspond to decision-related data values which may be interpreted as a digital value of the respective data sample $x_{n-j-1}$ and $x_{n-j}$ in the respective cycle. The decision-related data values $d_{n-j-1}$ and $d_{n-j}$ (symbol decisions) are obtained in a decision-related data means 64 based on the corrected data samples $x_{n-j}$.

In the easiest configuration and in case of a differential incoming data stream, a simple sign function can be applied which results in d="−1" for a negative x and d="+1" for a positive x of the respective cycle. In other embodiments, the decision-related data values $d_{n-j-1}$ and $d_{n-j}$ may be obtained by means of decision feedback equalizing as described below.

The digital timing function value $t_{n-l}$ is supplied to a first adder 62. The output of the first adder 62 corresponds to a timing estimation value $TEV_{n-l}$, which can be provided to an optional sign means 63 which determines the sign of the timing estimation value $TEV_{n-l}$. The timing estimation value $TEV_{n-l}$ or the sign of the timing estimation value $TEV_{n-l}$, respectively, is supplied to the known phase rotation means 4.

The timing function value $t_{n-l}$ provided by the timing function means 61 indicates by its sign whether the sampling of the current data sample occurred early or late with respect to a center of the data eye of the data stream DI. Particularly, a positive sign of the timing function value $t_{n-l}$ indicates that the data eye corresponding to the data sample $x_{n-l}$ has been sampled too early, while a negative sign of the timing function value $t_{n-l}$ indicates that the data eye corresponding to the data sample $x_{n-l}$ has been sampled too late.

To correct the delay caused by the propagation of the incoming data stream DI through the analog-digital converter 2, the (optional) feed-forward equalizer 5, and the timing function means 61, a phase correction is introduced by an inner loop. The inner loop feedbacks the obtained phase offset value $\phi_{n-k}$ to the adder 62, thereby introducing a phase offset to the timing estimation value TEV. In detail, an amplitude correction offset A is applied to the timing function value $t_{n-l}$ by means of the adder 62. The amplitude correction offset A is proportional to a change of the phase rotation value $\Delta\phi = \phi_{n-k} - \phi_{n-l}$ for a given number of symbols (cycles), which is obtained by means of a delay means 66, a difference means 67 and a gain means 68. The amplitude correction offset A corresponds to $\gamma\Delta\phi$, wherein $\gamma$ is obtained by a given impulse response characteristics h(t) of the data channel. The impulse response characteristics indicate a system's response to a rectangular impulse, as exemplarily shown in FIG. 3:

$$\gamma = \Delta t \cdot (h'_1 - h'_{-1}) \text{ with } h'_n = \left.\frac{dh(t)}{dt}\right|_{t=nT}$$

FIG. 3b shows a characteristics of a gradient of h(t):f(t)=dh(t)/dt.

The amplitude correction offset A applied to the timing function value t results in a timing offset of the timing estimation value (TEV), which is then virtually time-shifted, so that the phase rotation means 4 determines its phase offset value $\phi_{n-k}$ based on a time-shifted timing estimation value TEV or the sign of the time-shifted timing estimation value sign (TEV), respectively. Hence, a negative effect of the loop delay caused by the analog-digital converter 2 and the feed-forward equalizer 5 can be reduced by the amplitude correction offset A. Particularly, a jitter tolerance of the analog-digital converter 2 and the feed-forward equalizer 5 can be increased, so that low-latency analog-digital converters requiring high power can be replaced by analog-digital converters that have a higher latency and consume less power.

Substantially, the amplitude correction offset A is set to compensate for a change of the phase offset value $\Delta\phi$ in order to provide a virtual timing correction in the inner loop. In detail, the amplitude correction offset A is applied to (e.g., added to or subtracted from) the timing function value $t_{n-l}$, so that a positive change (an increase) of the phase offset value $\Delta\phi$ shifting the sampling time to "late" is responded to by a corresponding value for the amplitude correction offset A which effects a negative change (a decrease) of the phase offset value $\Delta\phi$. Analogously, the amplitude correction offset A is applied to (e.g., added to or subtracted from) the timing function value $t_{n-l}$, so that a negative change (a decrease) of the phase offset value $\Delta\phi$ shifting the sampling time to "early" is responded to by a corresponding value for the amplitude correction offset A which effects a positive change (an increase) of the phase offset value $\Delta\phi$.

The change of the phase offset value $\Delta\phi$, which is used for determining the amplitude correction offset A is determined by the given delay of the delay means 66. To avoid a double counting of the phase correction, the delay means 66 may be configured to set the delay to the delay between the output of the first adder 62 to the output of the phase rotation means 4. Thus, a difference of phase offset values $\phi_{n-k}$, which corresponds to the change of the phase offset values $\Delta\phi$ between the symbols n−k to n−l is applied to the gain means 68.

In general, the outer control loop formed by the analog-digital-converter 2, the optional FFE 5, timing estimation means 6, and the phase rotation means 4 and the inner control loop formed by the first adder 62, the optional first sign means 63, the phase rotation means 4, and the feedback loop with the difference means 67 and the gain means 68 both perform a feedback control to keep the timing function value to zero.

Figure 4:
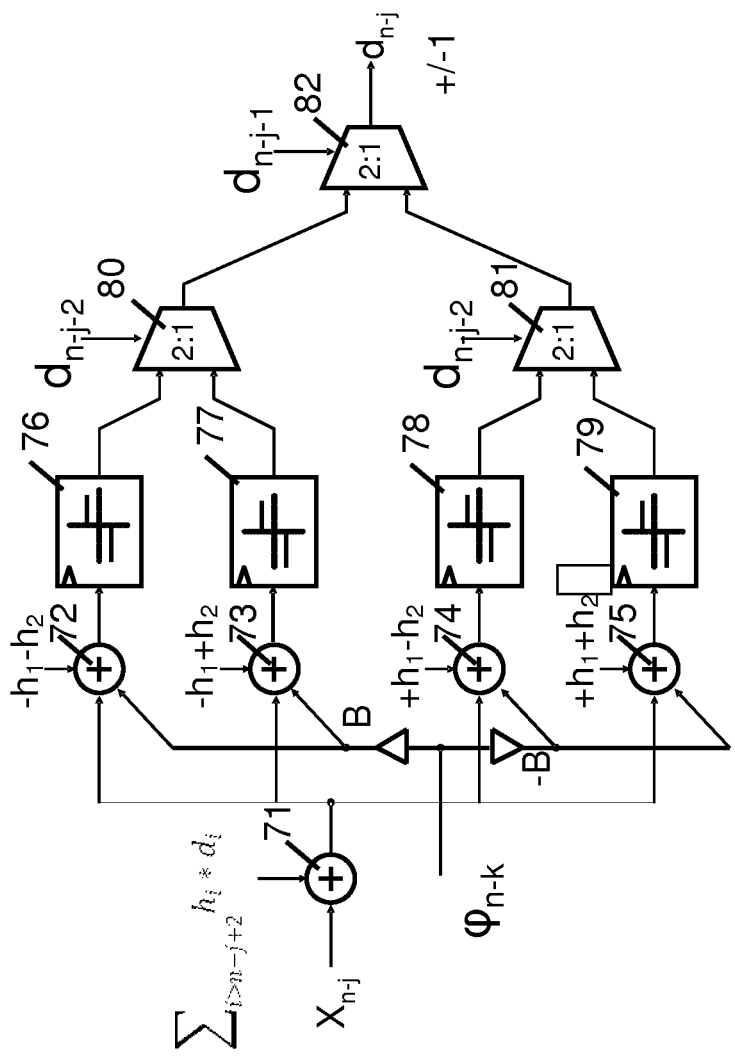
FIG. 4 shows a block diagram of a decision-related data block, in accordance with embodiments of the present invention.

FIG. 4 shows a more detailed block diagram of the decision-related data means 64 implementing a virtual timing correction also for a decision feedback equalizer as a decision-related data means 64. The decision feedback equalizer has as input the corrected data stream $x_{n-j-}$ and the phase offset value $\phi_{n-k}$.

The decision-related data means 64 has a second adder 71 which adds to the data samples $x_{n-j}$ the decision feedback equalizer correction term.

$$\Sigma_{i>n-j+2} h_i * d_i$$

The result of the second adder 71 is forwarded to a third adder 72, a fourth adder 73, a fifth adder 74, and a sixth adder 75. The third adder 72 is further provided with an input term related to the impulse responses, namely $-h_{n-j+1}-h_{n-j+2}$. The fourth adder 73 is further provided with an input term related to the impulse responses, namely $-h_{n-j+1}-h_{n-j+2}$, The fifth adder 74 is further pro-vided with an input term related to the impulse responses, namely $-h_{n-j+1}-h_{n-j+2}$, The sixth adder 75 is further provided with an input term related to the impulse responses, namely $-h_{n-j+1}-h_{n-j+2}$. The third and fourth adder 72, 73 are configured to receive a correction value B, which is based on the change of the phase offset value $\phi_{n-k}$. Particularly, the correction value B is added in the third adder 72 and the fourth adder 73.

Furthermore, the fifth adder 74 and the sixth adder 75 are configured to receive a negative correction value −B. Particularly, the correction value B is hence subtracted in the fifth adder 74 and the sixth adder 75.

The outputs of the third adder 72, fourth adder 73, fifth adder 75, and sixth adder 75 are applied to a respective third sign means 76, fourth sign means 77, fifth sign means 78, and sixth sign means 79, which outputs a "1" if the sign of the output of the respective adder (e.g., third adder 72, fourth adder 73, fifth adder 75, and sixth adder 75) is positive and a "−1" if the output of the respective adder is negative. The outputs of the third sign means 76 and fourth sign means 77 are supplied to a first multiplexer 80, and are selected depending on the decision-related data values $d_{n-j-2}$ related to a previous symbol, in the present case the symbol of two symbols before the current symbol. The outputs of the fifth sign means 78 and sixth sign means 79 are supplied to a second multiplexer 81, and are selected depending on the decision-related data values $d_{n-j-2}$ related to a previous symbol, in the present case the symbol of two symbols before the current symbol. The outputs of the first multiplexer 80 and second multiplexer 81 are input to a third multiplexer 82, wherein the signal input is selected depending on the decision-related data values $d_{n-j-1}$ related to a previous cycle, in the present case the cycle of one cycle before the current cycle, to obtain the decision-related data value $d_{n-j}$.

What is claimed is:

1. A phase rotation method for a clock recovery, comprising the steps of:
   providing a timing estimation value that indicates for each input data symbol at least whether an input data sample has been sampled early or late by a sampling clock signal;
   generating a phase offset value indicating a phase rotation of the sampling clock signal based on the timing estimation value; and
   modifying a timing function value that corresponds to an estimated timing difference relative to the sampling clock signal, based on a change of the phase offset value, resulting in the timing estimation value, wherein the timing function corresponds to a Mueller-Müller timing function.

2. The phase rotation method according to claim 1, wherein the timing function is calculated by a sum of terms, where each term multiplies a received input data sample with a decision-related data value.

3. The phase rotation method according to claim 1, wherein the timing function value is determined based on decision-related data values obtained by decision feed forward equalizing.

4. The phase rotation method according to claim 2, wherein the timing function value is determined based on decision-related data values obtained by decision feed forward equalizing.

5. The phase rotation method according claim 1, wherein the phase offset value is generated based solely on the sign of the timing estimation value.

6. The phase rotation method according to claim 2, wherein the phase offset value is generated based solely on the sign of the timing estimation value.

7. The phase rotation method according to claim 1, wherein the phase offset value is generated based on the sign and the amount of the timing estimation value.

8. The phase rotation method according to claim 2, wherein the phase offset value is generated based on the sign and the amount of the timing estimation value.

9. The phase rotation method according to claim 3, wherein decision-related data values are obtained based on a change of the phase offset value.

10. The phase rotation method according to claim 4, wherein decision-related data values are obtained based on a change of the phase offset value.

11. The phase rotation method according to claim 1, wherein the phase offset value is generated as the outcome of a second-order control loop, based on the timing estimation value as input.

12. The phase rotation method according to claim 1, wherein the timing function value is modified based on an amplitude correction value that is based on a gradient of an impulse response characteristics of the data channel close to a zero crossing.

13. The phase rotation method according to claim 12, wherein the amplitude correction value is further generated depending on a change of the phase offset value for a given number of symbols/cycles.

14. The phase rotation method according to claim 13, wherein the given number of cycles is selected based on the latency required for generating the phase offset value based on the timing estimation value.

15. The phase rotation method according to claim 1, wherein modifying the timing function value is performed such that a change of the phase offset value shifting the sampling clock signal to late is responded to by a corresponding value for an amplitude correction offset, which effects a change of the phase offset value shifting the sampling clock signal to early, and such that a change of the phase offset value shifting the sampling clock signal to early is responded to by a corresponding value for the amplitude correction offset, which effects a change of the phase offset value shifting the sampling clock signal to late.

16. A clock recovery method for recovering a clock from an incoming data stream, wherein data samples are obtained from the incoming data stream by sampling based on a sampling clock signal, wherein the sampling clock signal has a phase rotation based on a phase offset value, and wherein the phase offset value is generated based solely on the sign of a timing estimation value.

17. The clock recovery method according to claim 16, wherein the phase offset value is generated based on a sign and a amount of a timing estimation value.

18. A clock recovery apparatus, comprising:
   an analog digital converter means for sampling an incoming data stream to obtain input data samples;
   a timing estimation means that is configured to:

provide a timing estimation value that indicates for each of input data symbol at least whether an input data sample has been sampled early or late by a sampling clock signal, modify a timing function value which corresponds to an estimated timing difference relative to the sampling clock signal, based on a change of the phase offset value resulting in the timing estimation value, wherein the timing function corresponds to a Mueller-Müller timing function; and a phase rotation means for generating a phase offset value indicating a phase rotation of the sampling clock signal based on the timing estimation value.

* * * * *